US008800992B1

(12) United States Patent
Mack et al.

(10) Patent No.: US 8,800,992 B1
(45) Date of Patent: Aug. 12, 2014

(54) MATHEMATICS GAME

(76) Inventors: Jesse L. Mack, Lee's Summit, MO (US); Faye Mack, Lee's Summit, MO (US)

(*) Notice: Subject to any disclaimer, the term of this patent is extended or adjusted under 35 U.S.C. 154(b) by 85 days.

(21) Appl. No.: 13/467,981

(22) Filed: May 9, 2012

(51) Int. Cl.
*A63F 9/00* (2006.01)

(52) U.S. Cl.
USPC ............................................. 273/146; 273/299

(58) Field of Classification Search
USPC ....... 273/146, 272, 299, 145 R, 145 C, 144 B
See application file for complete search history.

(56) References Cited

U.S. PATENT DOCUMENTS

| | | | | |
|---|---|---|---|---|
| 2,739,815 A | * | 3/1956 | Fay | 273/145 C |
| 4,083,558 A | | 4/1978 | Young | |
| 4,428,580 A | * | 1/1984 | Pasquine | 273/145 C |
| 4,509,758 A | * | 4/1985 | Cole | 380/59 |
| 4,834,386 A | | 5/1989 | Rosenthal et al. | |
| 4,884,810 A | * | 12/1989 | Tiyony | 273/144 B |
| 5,106,103 A | * | 4/1992 | Fiore | 273/459 |
| D331,266 S | * | 11/1992 | Jaynes | D21/372 |
| 5,423,542 A | * | 6/1995 | Oraha | 273/144 B |
| 5,425,537 A | | 6/1995 | Vogelsang | |
| 6,089,871 A | | 7/2000 | Jaffe | |
| 6,464,224 B1 | | 10/2002 | Wusterbarth | |
| 7,389,988 B2 | | 6/2008 | Marbelt | |
| 7,494,124 B2 | | 2/2009 | Hole | |
| 8,002,280 B2 | * | 8/2011 | Kellond et al. | 273/145 C |
| 2003/0062672 A1 | | 4/2003 | Sloper | |
| 2011/0006478 A1 | | 1/2011 | Cline | |

* cited by examiner

*Primary Examiner* — William Pierce

(57) ABSTRACT

A mathematics game kit having five answer dice with six faces each labeled with a different number between 1 and 30, twenty function dice with six faces each labeled with a number between 1 and 25, a base with a grid divided into 25 cells in five columns and five rows wherein each cell is adapted to accept a die and the outermost column is the answer column, and a lid removably attached to the base, the lid allows the dice to be shaken in the base and randomly fall into cells. A partition is disposed in the lid to separate the answer dice and the cells in the answer column from the function dice and the remaining twenty cells.

3 Claims, 4 Drawing Sheets

(ISO Kit View)

(ISO Kit View)

(ISO View)

(Player Kit View)

4+6+1+3+7+3 = 24
6 numbers = 5 pts (Addition Example View)

(Division Example View)

(Score System View)

MATHEMATICS GAME

FIELD OF THE INVENTION

The present invention is directed to a game involving mathematics such as addition, subtraction, multiplication, and division.

BACKGROUND OF THE INVENTION

The proficiency level of essential math skills (knowing, understanding, computing, applying logical thinking) is currently stagnate and declining amongst adults and children alike. The present invention features a mathematics game. The game of the present invention can provide both children and adults an opportunity to develop and master key basic math skills (e.g., addition, subtraction, multiplication and division) at their own pace. Improved performance in these basic math skills can help individuals develop critical thinking skills, mental computation skills, probability skills and logical thinking skills.

SUMMARY

The present invention features a mathematics game kit. In some embodiments, the mathematics game kit comprises twenty function dice, each die is a cube having six faces, each face of the function dice is labeled with a particular number selected from the group consisting of 1, 2, 3, 4, 5, 6, 7, 8, 9, 10, 11, 12, 13, 14, 15, 16, 17, 18, 19, 20, 21, 22, 23, 24, and 25; five answer dice, each die is a cube having six faces, each face of the answer dice is labeled with a particular number selected from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, and 30, wherein 1, 2, 3, 4, 5, 6, 7, 8, 9, 10, 11, 12, 13, 14, 15, 16, 17, 18, 19, 20, 21, 22, 23, 24, 25, 26, 27, 28, 29, and 30 each appear on only one face of the five answer dice; a base with a grid divided into 25 cells in five columns and five rows, each cell is adapted to accept a die, an outermost column is an answer column with five answer cells, remaining cells are function cells; and a lid removably attached to the base, a partition is disposed in the lid such that when the lid is attached to the base the partition separates the answer cells from the function cells, the lid allows the answer dice to be shaken and randomly fall into the answer cells and the function dice to be shaken and randomly fall into the function cells.

In some embodiments, the mathematics game further comprises a timer. In some embodiments, the mathematics game kit further comprises a writing utensil and a writing paper.

The present invention also features a method of playing a mathematics game for a plurality of players. In some embodiments, the method comprises providing a kit comprising the mathematics game kit of the present invention; following a set of instructions for determining a winner of the mathematics game wherein the set of instructions comprises choosing a mathematical operation selected from the group consisting of: addition, subtraction, multiplication, or division; randomly inserting a function die into each function cell in the base and an answer die into each answer cell in the base; each player observing numbers on the dice in the function cells in the base and numbers on the dice in the answer cells in the base and during a fixed amount of time creating one or more strings of numbers that when applied to the mathematical operation equal a number found in the answer column, the strings of numbers can be obtained by selecting a first number and a second number adjacent to the first number and optionally a third number adjacent to the second number, a fourth number adjacent to the third number, a fifth number adjacent to the fourth number, a sixth number adjacent to the fifth number, a seventh number adjacent to the sixth number, a eighth number adjacent to the seventh number, a ninth number adjacent to the eighth number, a tenth number adjacent to the ninth number, an eleventh number adjacent to the tenth number, and a twelfth number adjacent to the fifth eleventh number, each die in the base can be used only one time in the string; after the fixed amount of time comparing strings amongst each player, if a string appears on more than one player's list then it is eliminated; and assigning points to each string based on the number of numbers used to create the string; and determining a winner, wherein a player with a highest number of points is the winner.

The number in the answer row can be used as many times as possible as long as the strings are different.

In some embodiments, the step of randomly inserting a function die into each function cell in the base and an answer die into each answer cell in the base comprises shaking the dice in between the base and the lid with the answer dice separated from the function dice by the partition in the lid. In some embodiments, the fixed amount of time is about 3 minutes. In some embodiments, a string of 2 numbers is assigned 1 point, a string of 3 numbers is assigned 1 point, a string of 4 numbers is assigned 2 points, a string of 5 numbers is assigned 3 points, a string of 6 numbers is assigned 5 points, a string of 7 numbers is assigned 8 points, a string of 8 numbers is assigned 10 points, a string of 9 numbers is assigned 11 points, and a string of 10 or more numbers is assigned 12 points.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
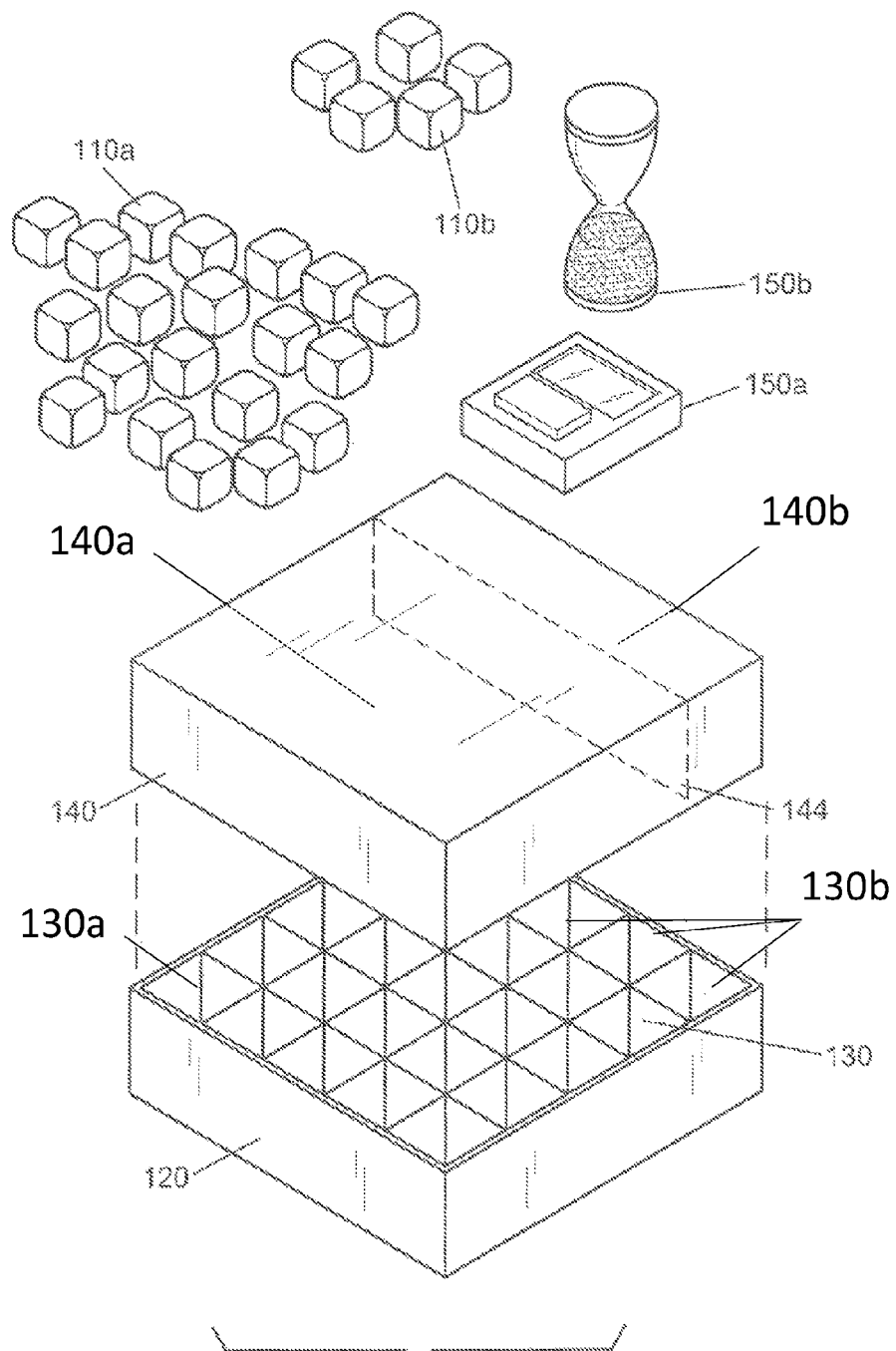
FIG. 1 is a perspective view of components of the game of the present invention.
Figure 2:
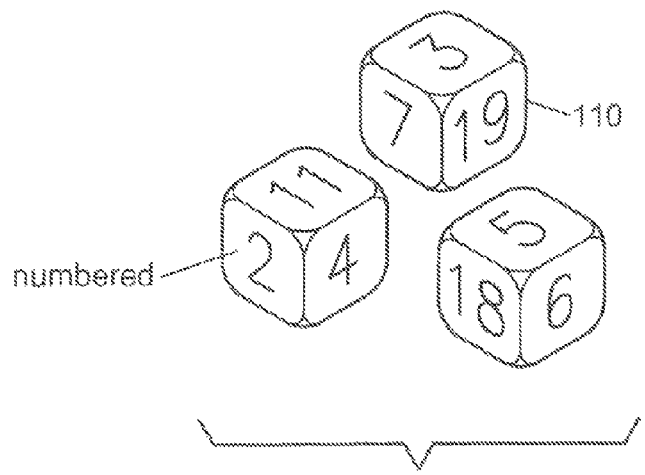
FIG. 2 is a perspective view of the dice of the game of the present invention.
Figure 3:
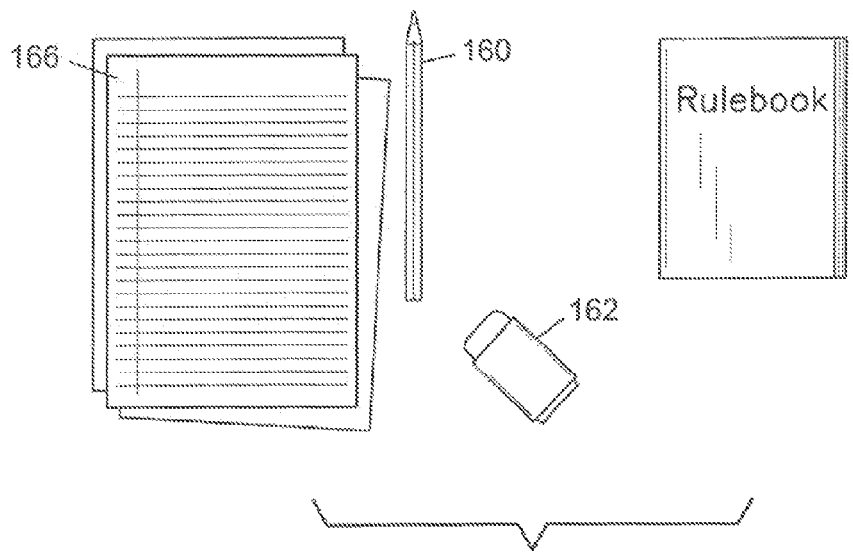
FIG. 3 is a top view of components of the game of the present invention.

Referring now to FIG. 1-6, the present invention features a mathematics game. The game comprises a plurality of dice 110. For example, the game comprises twenty function dice 110a (e.g., a first function die, a second function die, a third function die, a fourth function die, a fifth function die, a sixth function die, a seventh function die, a eighth function die, a ninth function die, a tenth function die, an eleventh function die, a twelfth function die, a thirteenth function die, a fourteenth function die, a fifteenth function die, a sixteenth function die, a seventeenth function die, an eighteenth function die, a nineteenth function die, and a twentieth function die. The game further comprises five answer dice 110b (e.g., a first answer die, a second answer die, a third answer die, a fourth answer die, and a fifth answer die). Dice are well known to one of ordinary skill in the art. Each die is a cube with six faces.

Each face of the answer dice is labeled with a particular number between 1 and 30, e.g., 1, 2, 3, 4, 5, 6, 7, 8, 9, 10, 11, 12, 13, 14, 15, 16, 17, 18, 19, 20, 21, 22, 23, 24, 25, 26, 27, 28, 29, and 30. The numbers 1 through 30 each appear on only one face of the five answer dice. The arrangement of the numbers 1 through 30 on the answer dice may be random. For example, in some embodiments, the first answer die is labeled with 1, 4, 8, 16, 28, and 30; the second answer die is labeled with 2, 11, 18, 20, 25, and 29; the third answer die is labeled with 3, 10, 13, 21, 23, and 24; the fourth answer die is labeled with 5, 9, 14, 15, 19, 26; and the fifth answer die is labeled with 6, 7, 12, 17, 22, and 27. The present invention is hot limited to the aforementioned example of the arrangement of the numbers 1-30 on the answer dice. For example, Table 1 shows non-limiting examples (Example 1, Example 2, and Example 3) of the arrangement of numbers on the answer dice.

TABLE 1

EXAMPLE 1

| ANSWER DIE #1 | ANSWER DIE #2 | ANSWER DIE #3 | ANSWER DIE #4 | ANSWER DIE #5 |
|---|---|---|---|---|
| 1 | 2 | 4 | 6 | 8 |
| 3 | 7 | 5 | 10 | 9 |
| 11 | 15 | 16 | 12 | 13 |
| 14 | 17 | 21 | 18 | 19 |
| 24 | 25 | 22 | 23 | 20 |
| 30 | 29 | 28 | 27 | 26 |

EXAMPLE 2

| ANSWER DIE #1 | ANSWER DIE #2 | ANSWER DIE #3 | ANSWER DIE #4 | ANSWER DIE #5 |
|---|---|---|---|---|
| 1 | 3 | 5 | 7 | 9 |
| 2 | 4 | 6 | 8 | 10 |
| 11 | 13 | 15 | 17 | 19 |
| 12 | 14 | 16 | 18 | 20 |
| 21 | 23 | 25 | 27 | 29 |
| 22 | 24 | 26 | 28 | 30 |

EXAMPLE 3

| ANSWER DIE #1 | ANSWER DIE #2 | ANSWER DIE #3 | ANSWER DIE #4 | ANSWER DIE #5 |
|---|---|---|---|---|
| 6 | 3 | 5 | 2 | 1 |
| 7 | 4 | 8 | 9 | 10 |
| 12 | 15 | 13 | 17 | 11 |
| 14 | 16 | 18 | 20 | 19 |
| 22 | 23 | 26 | 27 | 21 |
| 24 | 25 | 28 | 29 | 30 |

Each face of the function dice is labeled with a particular number between 1 and 25, e.g., 1, 2, 3, 4, 5, 6, 7, 8, 9, 10, 11, 12, 13, 14, 15, 16, 17, 18, 19, 20, 21, 22, 23, 24, and 25. The arrangement of the numbers on the function dice may be random. In some embodiments, the numbers 11 through 25 only appear twice on the function dice (e.g., out of the 120 faces of the 20 function dice, the number 11 only appears twice). In some embodiments, the number 10 appears five times on the function dice (e.g., out of the 120 faces of the 20 function dice the number 10 appears five times). In some embodiments, the number 9 appears six times on the function dice. In some embodiments, the number 8 appears fives times on the function dice. In some embodiments, the numbers 1 through 7 appear ten times on the function dice. In some embodiments, the numbers 1 through 7 appear at least ten times on the function dice. The present invention is not limited to the aforementioned distribution and frequency of numbers (e.g., in some embodiments, the numbers 1 through 5 appear at least 15 times on the function dice, in some embodiments, the number 25 only appears once on the function dice, etc.).

In some embodiments, the number 1 appears 10 times. In some embodiments, the number 2 appears 11 times. In some embodiments, the number 3 appears 11 times. In some embodiments, the number 4 appears 11 times. In some embodiments, the number 5 appears 11 times. In some embodiments, the number 6 appears 10 times. In some embodiments, the number 6 appears 10 times. In some embodiments, the number 8 appears 5 times. In some embodiments, the number 9 appears 6 times. In some embodiments, the number 10 appears 5 times. In some embodiments, the numbers 11-25 appear 2 times.

In some embodiments, the game of the present invention comprises additional dice (e.g., additional answer dice, additional function dice). For example, higher numbers may be provided, (e.g., for division or subtraction, etc.).

In some embodiments, the answer dice have a different appearance than the function dice. For example, in some embodiments, the answer dice are a different color than the function dice. In some embodiments, the answer dice have a distinguishing mark disposed on their surface. In some embodiments, the function dice have a distinguishing mark disposed on the their surface.

The game further comprises a base 120 with a grid 130 divided into 25 cells (in 5 columns and 5 rows), each adapted to accept a die 110. The outermost column is termed the "answer column". The answer column has five cells termed "answer cells (130b)." The remaining twenty cells are function cells (130a). A lid 140 is removably attached to the base 120. The lid (140) is divided into a function cell cavity (140a) and an answer cell cavity (140b) separated by a partition (144). The function cell cavity (140a) is positioned over all of the function cells (130a) and the answer cell cavity (140b) is positioned over all of the answer cells (130b). The lid 140 allows the dice 110 to be shaken and randomly fall into the cells. Dice are inserted into the base 120 and the lid 140 is covered. The dice are shaken and allowed to fall into the cells accordingly. The function cell cavity (140a) is deep to allow the function dice (110a) within the function cells (130a) to mix together when the lid (140) and base (120) are flipped upside down. The answer cell cavity (140b) is deep to allow the answer dice (110b) within the answer cells (130b) to mix together when the lid (140) and base (120) are flipped upside down. The partition (144) prevents the function dice (110a) from the function cell cavity (140a) and the answer dice (110b) from the answer cell cavity (140b) from mixing together (e.g., when the base and lid are flipped upside down). The dice in the answer column are not pre-positioned. All dice are shaken at the same time. The partition 144 keeps the dice in the answer row and the remaining rows separated. After shaking, the dice settle into the cells prior to remove of the lid 140.

The game further comprises a timer 150. The timer 150 may include but is not limited to a digital timer 150a, an analog timer, an hourglass timer 150b, the like, or a combination thereof. In some embodiments, the timer is a fixed time timer (e.g., an hourglass timer 150). In some embodiments, the fixed time is three minutes.

In some embodiments, the game further comprises a writing utensil 160 (e.g., a pencil, pen, marker, etc.) and/or an eraser 162 and/or a writing paper 166.

The object of the game is to earn the most number of points. Points are earned by finding mathematical combinations of the numbers shown in the grid (using a single operation such as addition, subtraction, multiplication, and division) that equate to the numbers shown in the answer column in the base. In general, the more numbers in the grid used to equate to the answer, the more points are awarded (see scoring information below).

To play the game, a mathematical operation is chosen: addition, subtraction, multiplication, or division. With the lid over the base, the dice are shaken. The lid (with the partition) may only attach one way to ensure the dice in the answer column cubes stay separated during the shaking process.

Figure 4:
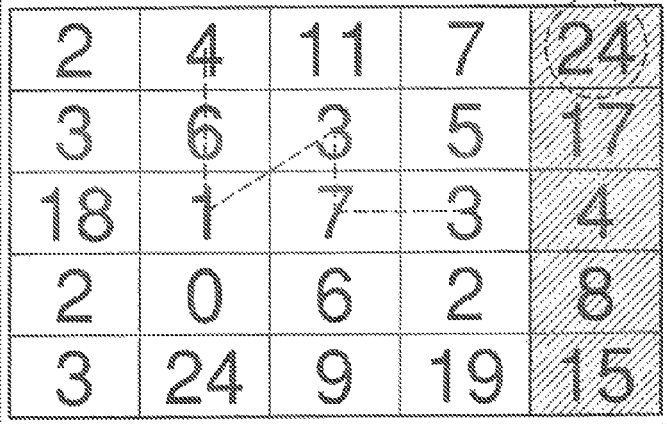
FIG. 4 is a schematic view of the base of the game of the present invention.

Each player observes the numbers that appear in the grid. Players attempt to string together two or more numbers in a row that equal one of the numbers in the answer column, e.g., players create a "string" for an answer. A player can move up, down, sideways, or diagonally to string numbers together. Numbers can only be used one time. For example, as shown in FIG. 4, if the operation is addition, a player can create the string "4+6+1+3+7+3" to arrive at a sum of 24. The player earns a certain number of points for the string, which has six numbers (e.g., 5 points). When a player finds a string for an answer, he/she writes it down on his/her sheet (e.g., the player writes "4+6+1+3+7+3=24"). A player can use as many combinations as he wishes to get to any answer in the answer column. For example, the player can select "3+2+1+3+2+4+6+2+1=24", a string of nine numbers, and the player will be assigned points for a string of nine (e.g., 12 points). Players continue to look for matching combinations until the allotted time is up.

Figures 5, 6:
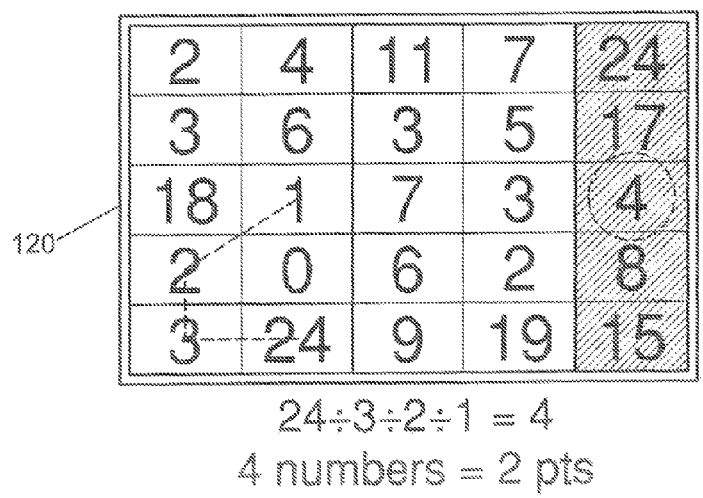
FIG. 5 is a schematic view of the base of the game of the present invention.
FIG. 6 is a chart showing an example of a scoring scheme of the game of the present invention.

As shown in FIG. 5, if the operation is division, a player can create the string "24÷3÷2÷1" to equal the answer 4.

Each game is played for a fixed amount of time (e.g., three minutes). In some embodiments, the time is 1 minute. In some embodiments, the time is 2 minutes. In some embodiments, the time is 3 minutes. In some embodiments, the time is 4 minutes. In some embodiments, the time is more than four minutes. When the time runs out, each player reads aloud his strings (including the answer). If a string of numbers appears (in the exact same order) on any other player's list, the string must be crossed off all lists; no player can get credit for the string unless he/she is the only one who found the string.

The number in the answer row can be used as many times as possible as long as the strings are different.

Scores are tallied. The player with the highest score wins. As shown in FIG. 6, in some embodiments, a string of 2 numbers is assigned 1 point. In some embodiments, a string of 3 numbers is assigned 1 point. In some embodiments, a string of 4 numbers is assigned 2 points. In some embodiments, a string of 5 numbers is assigned 3 points. In some embodiments, a string of 6 numbers is assigned 5 points. In some embodiments, a string of 7 numbers is assigned 8 points. In some embodiments, a string of 8 numbers is assigned 10 points. In some embodiments, a string of 9 numbers is assigned 11 points. In some embodiments, a string of 10 or more numbers is assigned 12 point. The present invention is not limited to the aforementioned point system.

In some embodiments, a single game is played and the player to earn the most points wins (e.g., "Basic Nummbles"). In some embodiments, multiple games (e.g., rounds) are played and the game is played until a player reaches a "winning score," e.g., 25 points, 50 points, 100 points, etc (e.g., "Tournament Nummbles"). The first player to reach the winning score wins.

In some embodiments, two, three, or four mathematical operations are used in a particular order, e.g., (1) addition then subtraction; (2) addition then multiplication; (3) addition then division; (4) subtraction then multiplication; (5) subtraction then division; (6) subtraction then addition; (7) multiplication then division; (8) multiplication then addition; (9) multiplication then subtraction; (10) division then addition; (11) division then subtraction; (12) division then multiplication; (13) addition then subtraction then multiplication; (14) addition then subtraction then division; (15) addition then multiplication then division; (16) addition then multiplication then subtraction; (17) addition then division then multiplication; (18) addition then division then subtraction; (19) subtraction then multiplication then division; (20) subtraction then multiplication then addition; (21) subtraction then addition then division; (22) subtraction-then addition then multiplication; (23) subtraction then division then addition; (24) subtraction then division then multiplication; (25) multiplication then addition then subtraction; (26) multiplication then addition then division; (27) multiplication then subtraction then division; (28) multiplication then subtraction then addition; (29) multiplication then division then addition; (30) multiplication then division then subtraction; (31) division then addition then subtraction; (32) division then addition then multiplication; (33) division then subtraction then multiplication; (34) division then subtraction then addition; (35) division then multiplication then addition; (36) division then multiplication then subtraction, etc. In some embodiments, the players choose the number of operations. In some embodiments, the players choose the number and the order of the operations.

The disclosures of the following U.S. patents are incorporated in their entirety by reference herein: U.S. Pat. No. 4,083,558; U.S. Pat. No. 4,834,386; U.S. Pat. No. 5,425,537; U.S. Pat. No. 6,089,871; U.S. Pat. No. 6,464,224; U.S. Pat. No. 7,389,988; U.S. Pat. No. 7,494,124; U.S. Patent Application No. 2003/0062672; U.S. Patent Application No. 2011/0006478.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A mathematics game kit comprising:
   (a) twenty function dice (110*a*), each die is a cube having six faces, each face of the function dice is labeled with a particular number selected from the group consisting of 1, 2, 3, 4, 5, 6, 7, 8, 9, 10, 11, 12, 13, 14, 15, 16, 17, 18, 19, 20, 21, 22, 23, 24, and 25;
   (b) five answer dice (110*b*), each die is a cube having six faces, each face of the answer dice is labeled with a particular number selected from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, and 30, wherein 1, 2, 3, 4, 5, 6, 7, 8, 9, 10, 11, 12, 13, 14, 15, 16, 17, 18, 19, 20, 21, 22, 23, 24, 25, 26, 27, 28, 29, and 30 each appear on only one face of the five answer dice;

(c) a base (120) with a grid (130) divided into 25 cells in five columns and five rows, each cell is adapted to accept a die (110), an outermost column is an answer column with five answer cells (130b), the twenty remaining cells are function cells (130a); and (d) a lid (140) removably attached to the base (120), the lid (140) is divided into a function cell cavity (140a) and an answer cell cavity (140b) separated by a partition (144), the function cell cavity (140a) is positioned over all of the function cells (130a) and the answer cell cavity (140b) is positioned over all of the answer cells (130b), the function cell cavity (140a) is deep to allow the function dice (110a) within the function cells (130a) to mix together when the lid (140) and base (120) are flipped upside down, and the answer cell cavity (140b) is deep to allow the answer dice (110b) within the answer cells (130b) to mix together when the lid (140) and base (120) are flipped upside down, the partition (144) prevents the function dice (110a) from the function cell cavity (140a) and the answer dice (110b) from the answer cell cavity (140b) from mixing together, the lid (140) allows the answer dice (110) to be shaken and randomly fall into the answer cells and the function dice (110a) to be shaken and randomly fall into the function cells.

2. The mathematics game kit of claim 1 further comprising a timer (150).

3. The mathematics game kit of claim 1 further comprising a writing utensil (160) and a writing paper (166).

* * * * *